(12) United States Patent
Lee

(10) Patent No.: US 7,710,512 B2
(45) Date of Patent: May 4, 2010

(54) PRISM SHEET, BACKLIGHT UNIT AND LIQUID CRYSTAL DISPLAY

(75) Inventor: Jung Hoon Lee, Chungcheongbuk-do (KR)

(73) Assignee: LG Electronics Inc., Seoul (KR)

( * ) Notice: Subject to any disclaimer, the term of this patent is extended or adjusted under 35 U.S.C. 154(b) by 260 days.

(21) Appl. No.: 11/528,417

(22) Filed: Sep. 28, 2006

(65) Prior Publication Data

US 2007/0263412 A1 Nov. 15, 2007

(30) Foreign Application Priority Data

May 9, 2006 (KR) ...................... 10-2006-0041675

(51) Int. Cl.
*G02F 1/1335* (2006.01)
(52) U.S. Cl. .............................. 349/64; 349/62; 349/65
(58) Field of Classification Search ................ 349/112, 349/113, 61, 62, 64, 65, 95, 67
See application file for complete search history.

(56) References Cited

U.S. PATENT DOCUMENTS

| | | | |
|---|---|---|---|
| 5,442,523 A | * | 8/1995 | Kashima et al. ............. 362/617 |
| 5,521,797 A | * | 5/1996 | Kashima et al. ............. 362/617 |
| 5,724,108 A | * | 3/1998 | Shibata ........................ 349/62 |
| 5,730,518 A | * | 3/1998 | Kashima et al. ............. 362/619 |
| 5,808,784 A | * | 9/1998 | Ando et al. .................. 359/443 |
| 5,914,759 A | * | 6/1999 | Higuchi et al. ................ 349/57 |
| 6,075,649 A |   | 6/2000 | Naito |
| 6,091,547 A | * | 7/2000 | Gardiner et al. ............. 359/625 |
| 6,123,431 A |   | 9/2000 | Teragaki et al. |
| 6,356,389 B1 | * | 3/2002 | Nilsen et al. ................. 359/625 |

(Continued)

FOREIGN PATENT DOCUMENTS

| | | |
|---|---|---|
| JP | 8-36179 A | 2/1996 |
| KR | 10-0447801 | 8/2004 |
| KR | 10-0447801 B1 | 9/2004 |
| KR | 2004079028 A * | 9/2004 |
| WO | WO-96/10148 A1 | 4/1996 |

OTHER PUBLICATIONS

English language abstract for TW-M277950 (Oct. 11, 2005).
English language abstract for TW-M277952 (Oct. 11, 2005).

*Primary Examiner*—Uyen-Chau N Le
*Assistant Examiner*—Rhonda S Peace
(74) *Attorney, Agent, or Firm*—Birch, Stewart, Kolasch & Birch, LLP

(57) ABSTRACT

The present invention relates to a liquid crystal display having excellent brightness without moiré patterns. The present invention also relates to a prism sheet and backlight unit which may improve the brightness of the liquid crystal display while removing the moiré patterns. A prism sheet comprises a protective layer including a base material consisting of a light-transmissive resin; and a plurality of diffusion particles distributed in the protective layer to scatter the light input into the base material; a base film disposed on a surface of the protective layer, wherein the light emitted from the protective layer is input into the base film; and a plurality of linear prisms having a pitch of between about 32 μm and about 38 μm and disposed in parallel on a surface of the base film.

7 Claims, 5 Drawing Sheets

U.S. PATENT DOCUMENTS

| | | | |
|---|---|---|---|
| 7,380,970 B2 * | 6/2008 | Hwang et al. | 362/620 |
| 2002/0015123 A1 | 2/2002 | Iwata et al. | |
| 2002/0097358 A1 * | 7/2002 | Ueki et al. | 349/113 |
| 2003/0133301 A1 * | 7/2003 | Mullen | 362/332 |
| 2004/0061944 A1 | 4/2004 | Kashima et al. | |
| 2004/0080938 A1 * | 4/2004 | Holman et al. | 362/231 |
| 2004/0234724 A1 * | 11/2004 | Kaminsky et al. | 428/141 |
| 2006/0114567 A1 | 6/2006 | Shim et al. | |
| 2006/0268438 A1 * | 11/2006 | Lee et al. | 359/837 |
| 2007/0086209 A1 * | 4/2007 | Hwang et al. | 362/620 |

* cited by examiner

PRISM SHEET, BACKLIGHT UNIT AND LIQUID CRYSTAL DISPLAY

CROSS-REFERENCE TO A RELATED APPLICATION

The present application claims the benefit of priority under 35 U.S.C. 119 based on the Korean patent application number 10-2006-0041675 filed on May 9, 2006. This application is incorporated herein by reference.

BACKGROUND OF THE INVENTION

1. Field of the Invention

The present invention relates to a liquid crystal display having excellent brightness without moiré patterns. The present invention also relates to a prism sheet and a backlight unit which may improve the brightness of the liquid crystal display without developing the moiré patterns.

2. Description of the Related Art

The liquid crystal display, also know as LCD, is an electronic device that transforms electrical signals into visual signals by utilizing the change in the transmittance of liquid crystals according to applied voltages.

As well known in the art, the liquid crystal display is a non-emitting display device. Therefore, the liquid crystal display needs to use an outside light source unit for illuminating uniformly the viewing plane of liquid crystal panel outside the liquid crystal panel in order to display visual information. The backlight unit is conventionally used to provide light to the viewing plane of the liquid crystal panel.

The backlight unit may be classified into two types: direct type and edge-light type according to the position where the light source is disposed. In the direct type, the light source is disposed directly at the back of the liquid crystal panel, whereas the light source is disposed along a side surface of the light guide plate in the edge-light type.

FIG. 1 is a perspective view of the backlight unit for illuminating the liquid crystal panel from the back of the liquid crystal panel, wherein the backlight unit is of the edge-light type.

As shown in FIG. 1, the backlight unit 10 comprises a light source unit 1, a reflector sheet 2, a light guide plate 3, and a plurality of optical sheets 4, 5 and 6.

The light source unit 1 comprises a light source 1a and a light source reflector 1b. The light source 1a is received inside the light source reflector 1b, and disposed along the side surface of the light guide plate 3. The light source reflector 1b reflects the light generated at the light source 1a toward the light guide plate 3, thereby the light efficiency of backlight unit 10 can be improved.

The light guide plate 3 mixes the light input through the light incidence surface disposed at its side surface and emits the mixed light through the light emitting surface disposed at its upper surface in a direction toward the liquid crystal panel (not shown).

The reflector sheet 2 reflects the light emitted through the lower surface of the light guide plate 3 so that the light is re-input into the inside of the light guide plate 3, which improves the light efficiency of the backlight unit 10.

The optical sheets 4, 5 and 6 may be comprised of a diffuser sheet 4, a prism sheet 5 and a protector sheet 6. Hereinafter, the functions of each component of the optical sheets 4, 5 and 6 will be described.

The light emitted through the upper surface of the light guide plate 3 enters into the diffuser sheet 4. The diffuser sheet 4 scatters the light to make the brightness uniform and widen the viewing angle.

Because the brightness declines sharply while the light passes through the diffuser sheet 4, the prism sheet 5 is provided in the backlight unit 10 to compensate such declination of brightness. The prism sheet 5 refracts the light emitted from the diffuser sheet 4 in a low angle to collimate the light toward the front direction, thereby the brightness is improved within the effective viewing angle.

FIG. 2 is a cross-sectional view of the prism sheet of FIG. 1 taken along the line I-I'.

Referring to FIG. 2, the prism sheet 5 is comprised of a base film 10, a prism base 11 disposed on the base film and a plurality of prisms 12 disposed on the prism base.

The prism sheet 5 reflects and resends toward the light guide plate (3 of FIG. 1) a portion of the light emitting from the diffuser sheet (4 of FIG. 1) in a certain angle. The prism sheet 5 also refracts the remaining portion of the light to be collimated toward the front direction where the liquid crystal panel (not shown) is disposed, thereby the brightness is improved within the effective viewing angle.

Referring back to FIG. 1, the protector sheet 6 is disposed over the prism sheet 5. The protector sheet 6 prevents the surface of the prism sheet 5 from being damaged, and also widens the viewing angle narrowed by the prism sheet 5.

The liquid crystal panel generally includes repeated patterns of a plurality of transistors and electrode components. However, the patterns of the liquid crystal panel along with the other patterns of the optical devices provided in the backlight unit illuminating the liquid crystal panel develops moiré patterns.

Information relevant to attempts to address the problem of the moiré patterns can be found in U.S. Pat. No. 6,091,547 (3M Innovative Properties Company), which discloses a luminance control film having less than 30 µm pitched prisms. However, the luminance control film of the reference suffers from the deterioration of the brightness where the pitch of the prism is less than 30 µm. And such fine pitch is also not advantageous in terms of manufacturing process or thermal and mechanical properties.

SUMMARY OF THE INVENTION

An object of the present invention is to provide the backlight unit which emits in high brightness and has no moiré patterns, and the liquid crystal unit having such backlight unit.

Another object of the present invention is to provide the prism sheet which has an excellent capability of collimating the light toward the viewing plane of the liquid crystal panel, i.e. light collimating efficiency, and addressing the problem of the moiré patterns.

Further another object of the present invention is to provide the prism sheet which has an excellent thermal resistance and mechanical strength.

To fulfill one or more of the above objects, the present invention provides a backlight unit configured to illuminate a liquid crystal panel, comprising: at least one light source generating light to be provided to the liquid crystal panel; and at least one prism sheet disposed at the back of the liquid crystal panel to collimate the light such that the light through the prism sheet becomes substantially perpendicular to the viewing plane of the liquid crystal panel, the prism sheet including: a protective layer including a base material consisting of a light-transmissive resin; and a plurality of diffusion particles distributed in the protective layer to scatter the light input into the base material; a base film disposed on a surface of the protective layer, wherein the light emitted from the protective layer is input into the base film; and a plurality of linear prisms having a pitch of between about 32 μm and about 36 μm and disposed in parallel on a surface of the base film.

The present invention also provides a liquid crystal display comprising: a liquid crystal panel displaying images according to electrical signals provided from the outside device; and a backlight unit configured to illuminate a liquid crystal panel, comprising: at least one light source generating light to be provided to the liquid crystal panel; and at least one prism sheet disposed at the back of the liquid crystal panel to collimate the light such that the light through the prism sheet becomes substantially perpendicular to the viewing plane of the liquid crystal panel, the prism sheet including: a protective layer including a base material consisting of a light-transmissive resin; and a plurality of diffusion particles distributed in the protective layer to scatter the light input into the base material; a base film disposed on a surface of the protective layer, wherein the light emitted from the protective layer is input into the base film; and a plurality of linear prisms disposed in parallel on a surface of the base film.

Still, the present invention also provides a prism sheet comprising: a protective layer including a base material consisting of a light-transmissive resin; and a plurality of diffusion particles distributed in the protective layer to scatter the light input into the base material; a base film disposed on a surface of the protective layer, wherein the light emitted from the protective layer is input into the base film; and a plurality of linear prisms having a pitch of between about 32 μm and about 36 μm and disposed in parallel on a surface of the base film.

BRIEF DESCRIPTION OF THE DRAWINGS

These and other features, aspects and advantages of the present invention will become better understood with regard to the following description, appended claims, and accompanying drawings where:

FIG. 5b is a cross-sectional view of the prism sheet of FIG. 5a;

FIG. 6a is a cross-sectional view of another embodiment of the backlight unit of FIG. 6a;

FIG. 6b is an enlarged view of the prism sheets of FIG. 6a; and

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
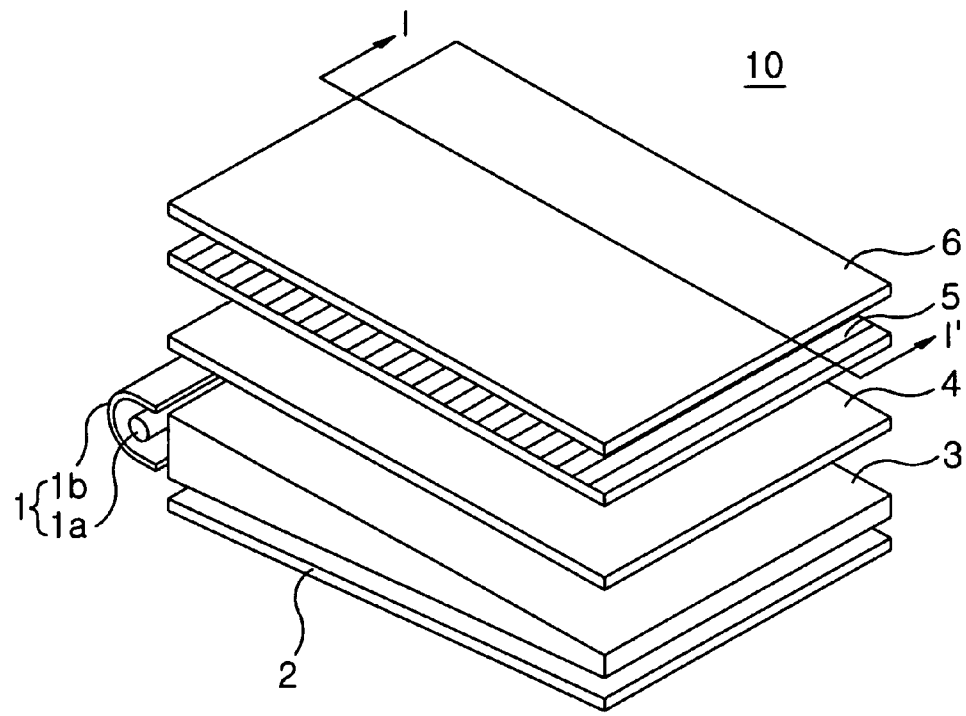
FIG. 1 is a perspective view of the backlight unit for illuminating the liquid crystal panel from the back of the liquid crystal panel.
Figure 2:
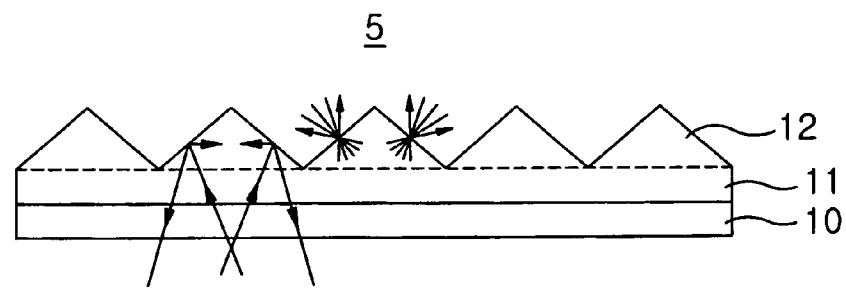
FIG. 2 is a cross-sectional view of the prism sheet of FIG. 1 taken along the line I-I'.
Figure 3:
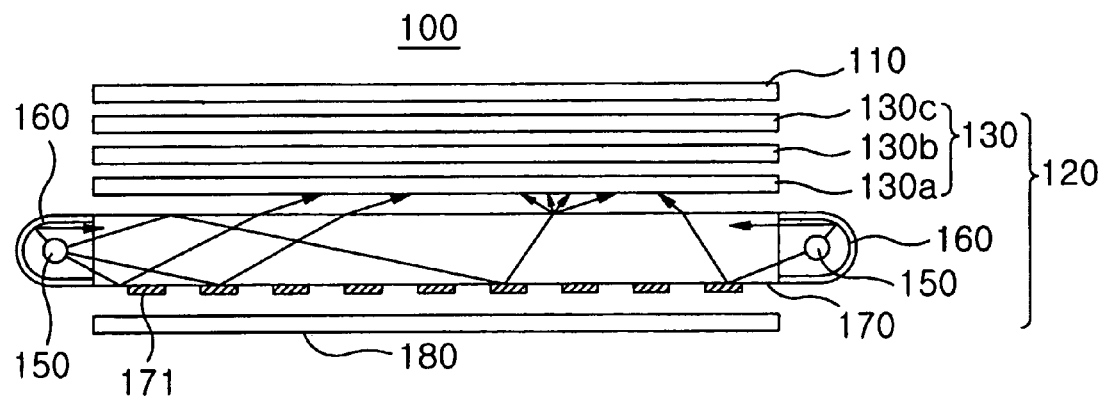
FIG. 3 is a cross-sectional view of the liquid crystal display according to one embodiment of the present invention.
Figure 4:
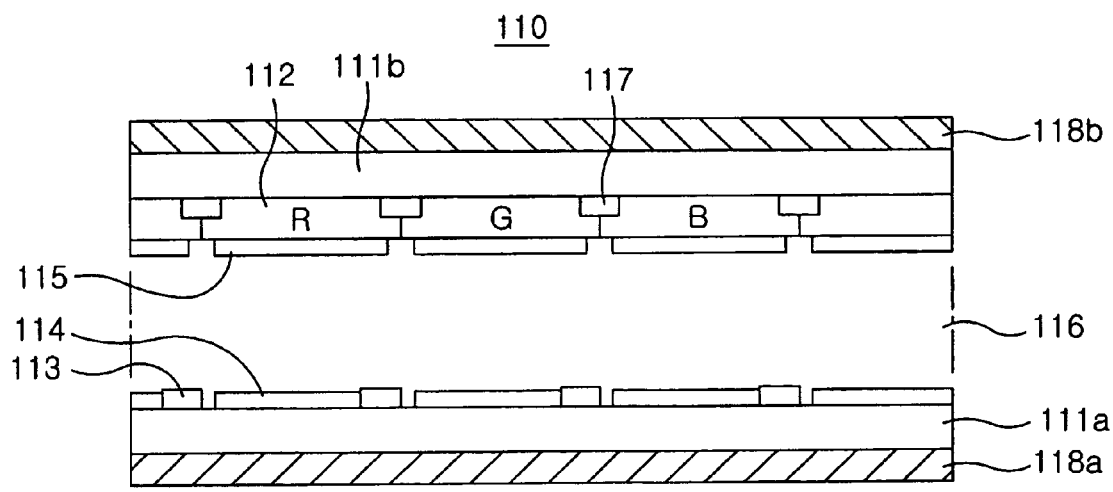
FIG. 4 is a cross-sectional view of an example of the liquid crystal panel of FIG. 3.

FIG. 3 is a cross-sectional view of the liquid crystal display 100 according to one embodiment of the present invention, and FIG. 4 is a cross-sectional view of an example of the liquid crystal panel 110 of FIG. 3.

Referring to FIGS. 3 and 4, the liquid crystal display 100 comprises a liquid crystal panel 110 displaying images according to driving signals and data signals provided by the outside device, and a backlight unit 120 illuminating the liquid crystal panel 110 from its back.

To understand and work the present invention, it is not important to describe the detailed structure of the liquid crystal panel 110. And the idea of the present invention is widely applicable to any type of liquid crystal panel usually employed in the liquid crystal display. Therefore, the structure of the liquid crystal panel 110 described hereinafter is presented only for the purpose of an example to help understand the present invention.

The liquid crystal panel 110 comprises a lower substrate 111a, an upper substrate 111b, a color filter layer 112, a black matrix layer 117, pixel electrodes 114, a common electrode 115, a liquid crystal layer 116, TFT array 113 and a pair of polarizer films 118a and 118b each disposed on the outer surfaces of the lower substrate 111a and the upper substrates 111b respectively.

The color filter layer 112 includes color filters which correspond to red color R, green color G and blue color B and generate images corresponding to red, green and blue colors when the light is provided to them.

The TFT array 113 is a set of switching device for switching the pixel electrodes 114.

The common electrode 115 and the pixel electrodes 114 change the arrangement of the liquid crystal molecules in the liquid crystal layer 116 according to the applied voltages.

The liquid crystal layer 116 consists of a plurality of liquid crystal molecules. The liquid crystal molecules change their arrangement with the voltage difference generated between the pixel electrodes 114 and the common electrode 115, thereby the light provided from the backlight unit 120 is input into the color filter layer 112.

The backlight unit 120 is disposed at the back of the liquid crystal panel 110 to provide light, for example white light.

The backlight unit 120 comprises light sources 150, light source reflectors 160 each disposed at the outside of the light source 150, a light guide plate 170 receiving the light from the light source and emitting the light to the liquid crystal panel 110, and a set of optical sheets 130 disposed between the light guide plate 170 and the liquid crystal panel 110. The backlight unit 120 is of the edge-light type where the light sources 150 are disposed along the two side surfaces of the light guide plate 170.

The light source 150 according to one embodiment of the present invention is a linear light source such as a cold cathode fluorescent lamp (CCFL) and an external electrode fluorescent lamp (EEFL). Alternatively, the light source 150 may be a point light source such as a light emitting diode (LED).

The light source reflector 160 is disposed outside each light source 150. The light source reflector 160 may be made of metal or plastic. The inner surface of the light source reflector 160 may be coated with light reflective materials to reflect the light from the light source 150 to the side surface of the light guide plate 170.

The light source reflector 160 reflects the light generated from the light source 150 to be input into the light guide plate 170 through its side surface, i.e. the light incidence surface, thereby the light efficiency of the backlight unit 120 can be improved.

The light guide plate 170 mixes the light input through the light incidence surface before emitting the light through the light emitting surface while transporting the light in a direction substantially parallel to the viewing plane of the liquid crystal panel 110 located at the upper position by the principle of the total reflection. The upper surface of the light guide plate 170 becomes the light emitting surface for emitting the light toward the position where the liquid crystal panel 110 is disposed.

The total reflection must be transformed to the scattered reflection in order for the light at the inside of the light guide plate 170 to be emitted toward the liquid crystal panel 110. For this purpose, light scattering patterns 171 may be printed on the lower surface of the light guide plate 170 by using dot-printing techniques.

Alternatively, a print-less light guiding plate which does not need printing process may be used. U.S. Pat. No. 6,123,431 discloses a print-less type of light guide plate which has the light scattering patterns obtained by forming grooves on a surface of the light guide plate, and U.S. Pat. No. 6,123,431 discloses another type of print-less light guide having additionally the function of a diffuser plate. The light guide plate disclosed in the U.S. Pat. No. 6,123,431 is obtained by dispersing inorganic or organic particles having different refractivity from that of the basic resin in the light guide plate to provide the light guide plate with the scattering function, wherein scattering may occur from the difference of the refractivity between the basic resin and the inorganic (or organic) particles. The above publications are herein incorporated by reference.

The light guide plate 170 may be formed of a transparent acrylate resin such as polymethyl methacrylate (PMMA).

The reflector sheet 180 is disposed under the light guide plate 170 to re-input the light emitted through the lower surface of the light guide plate 170 into the inside of the light guide plate 170.

The reflector sheet 180 may be manufactured by applying Ag on a sheet made of SUS, Brass, Al, PET, etc and coating it with Ti to prevent the thermal deterioration caused by heat absorption.

Alternatively, the reflector sheet 180 may be obtained by dispersing micro-pores capable of scattering the light in a resin sheet such as PET.

The backlight unit 120 comprises a set of optical sheets 130 disposed between the light guide plate 170 and the liquid crystal panel 110. The set of optical sheets 130 allow the light emitted through the light guide plate 170 to effectively enter the viewing plane of the liquid crystal panel 110, thereby the brightness is enhanced. The set of optical sheets 130 also make uniform the light entering the liquid crystal panel 110, thereby the brightness uniformity across the viewing plane is improved.

According to one embodiment of the present invention, the set of optical sheets 130 are comprised of a diffuser sheet 130a, a prism sheet 130b and a protector sheet 130c.

The diffuser sheet 130a is disposed over the light guide plate 170 in parallel to the light emitting surface. The diffuser sheet 130a has diffusion particles such as beads which are randomly distributed in the diffuser sheet 130a and capable of scattering the light. The diffuser sheet 130a may also have a protective layer with high haze effect and high transmittance. The diffuser sheet 130a scatters the light emitted through the light guide plate 170 so that the brightness becomes uniform across the viewing plane of the liquid crystal panel 110. And, the diffuser sheet 130a widens the viewing angle and also hides the patterns formed on the light guide plate 170.

The specified structure and materialistic property of the diffuser sheet 130a are not important to understand and work the present invention, and conventional structure and material normally used in the art are widely applicable to the diffuser sheet 130a of the present invention.

The prism sheet is disposed over the diffuser sheet 130a to improve the light efficiency and the brightness. Hereinafter, the preferred embodiments of the prism sheet 130b of the present invention will be described in detail with reference to the accompanying drawings.

Figure 5A:
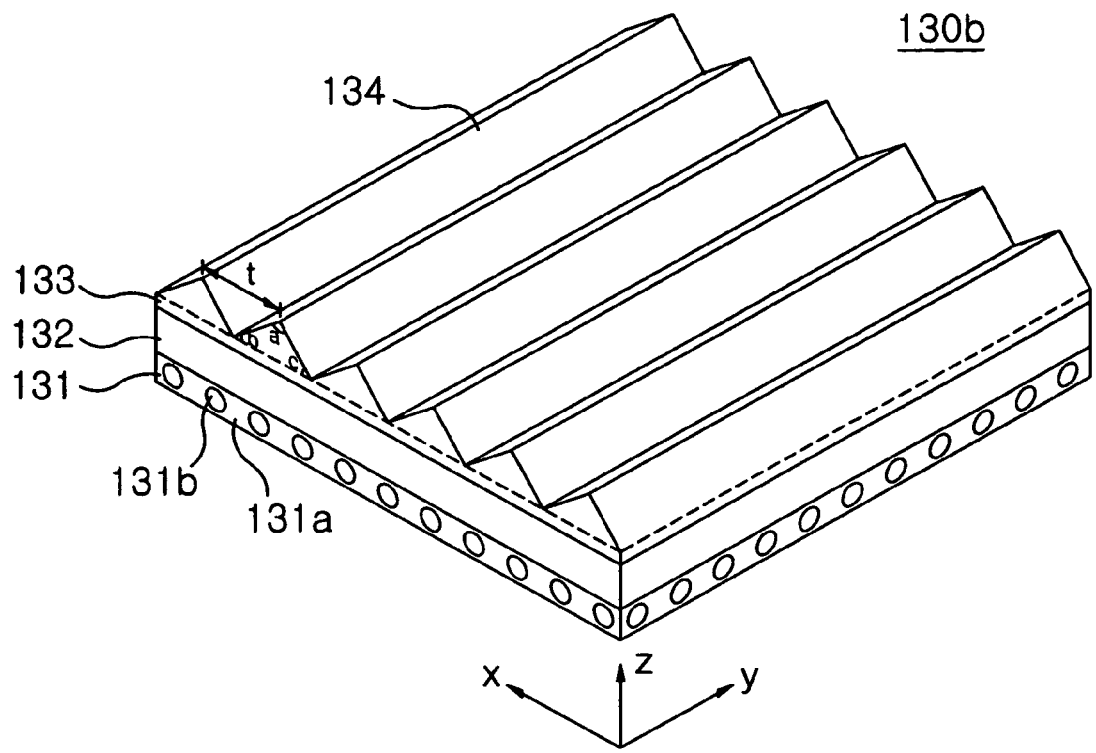
FIG. 5a is a perspective view of one embodiment of the prism sheet of FIG. 3.
Figure 5B:
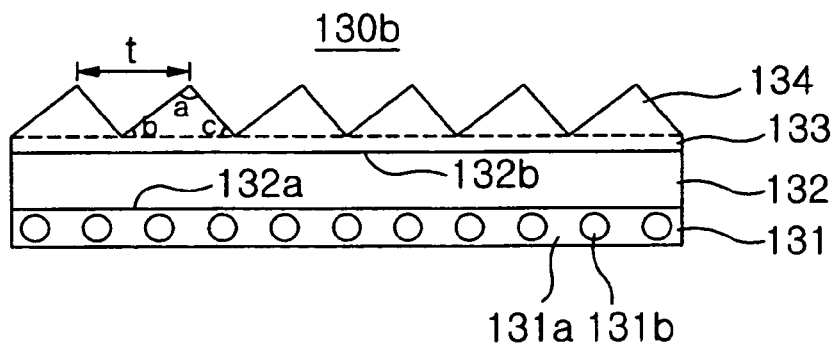
Figure 5C:
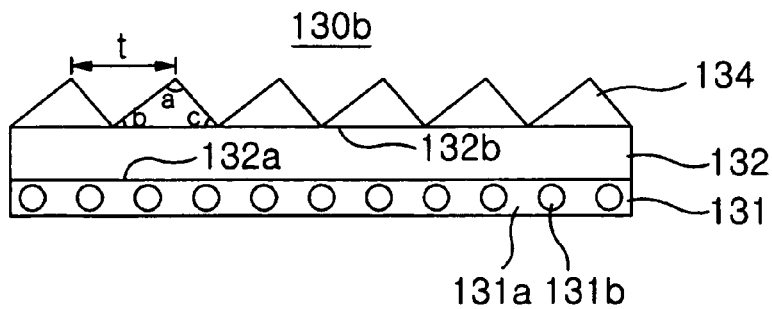
FIG. 5c is a cross-sectional view of another embodiment of the prism sheet of FIG. 3.

FIG. 5a is a perspective view of one embodiment of the prism sheet of FIG. 3; and FIG. 5b is a cross-sectional view of the prism sheet of FIG. 5a. And, FIG. 5c is a cross-sectional view of another embodiment of the prism sheet of FIG. 3.

Referring to FIGS. 5a and 5b, the prism sheet 130b according to one embodiment of the present invention comprises a protective layer 131, a base film 132 and a plurality of prisms 134 disposed on the base film 132. Also, the prism sheet 130b can be further comprise a prism base 133 disposed on the based film 132, as shown in FIGS. 5a and 5b.

The protective layer 131 serves to improve the thermal resistance of the prism sheet 130b, and to diffuse the light passing through the light guide plate (170 of FIG. 3), thereby to make the light uniform. In particular, the protective layer 131 comprises a base material 131a consisting of a resin and diffusion particles 131b distributed in the base material.

The resin for the base material 131a may be an acrylate resin which has good light-transmittance and also has good thermal resistance and mechanical strength. Preferably, the acrylate resin is polyacrylate, polymethyl methacrylate (PMMA) or a combination thereof.

The diffusion particles 131b may be for example beads made of the same resin as the base material 131a or other resins. The diffusion particles 131b are preferably contained by about 25 wt % to 35 wt % against the base material 131a. Most preferably, the diffusion particles 131b are contained by about 30 wt % against the base material 131a According to one embodiment of the present invention, the diffusion particles 131b are of the same size, and uniformly distributed in the base material 131a. Such uniform distribution of the diffusion particles 131b of substantially the same size in the base material 131a enables the brightness to increase although the haze effect rather decreases.

According to another embodiment of the present invention, the diffusion particles 131b of different sizes may be randomly distributed in the base material 131a. Such structure increases the haze effect to prevent the defects such as scratches that physical contacts would make on a lower surface of the base material 131a or the diffuser sheet (130a of FIG. 3) from being projected onto the liquid crystal panel (110 of FIG. 3).

Also, the protective layer 131 may prevent the thermal deformation of the prism sheet 130b that would otherwise be caused because of the heat generated by the light source (150 of FIG. 3). Namely, the base material 131a with high thermal resistance rarely induces the wrinkles of the prism sheet 130b, and even if the prism sheet 130b is once deformed under high temperature, the prism sheet 130b may recover its original shape with its high elastic force.

Furthermore, the protective layer 131 may prevent the surface of the prism sheet 130b from being damaged by the mechanical impact such as friction.

The thickness of the protective layer 131 containing the diffusion particles 131b will vary widely according to the thickness of the base film 132, the prism base 133 and the prisms 134 disposed thereon. However, in general, the thickness of the protective layer 131 is about 2 µm to 10 µm.

Preferably, the thickness of the protective layer 131 is about 2 µm to 5 µm. Most preferably, the thickness of the protective layer 131 is 3 µm.

The thickness of the base film 132, the prism base 133 and the prisms 134 is not necessarily in proportion to the thickness of the protective layer 131. For example, in case that the thickness of the base film 132 and the prisms 134 is sufficiently large, the protective layer 131 may be designed to be thin because the base film 132 and the prisms 134 themselves may provide the prism sheet 130b with enough thermal resistance.

The base film 132 supports the prisms 134. The base film 132 includes a light incidence surface 132a through which the light passing through the protective layer 131 is input into the inside of the base film 132, and a light emitting surface 132b which is disposed oppositely to the light incidence surface 132a and through which the light is emitted outside the base film 132.

The distance between the light incidence surface 132a and the light emitting surface 132b, i.e. the thickness of the base film 132 may be without limitation selected by the skilled person in the art considering the use of the prism sheet 130b. However, in general, the thickness of the base film 132 is about 30 µm to 60 µm. Preferably, the thickness of the base film 132 is about 45 µm to 55 µm.

The base film 132 may be manufactured in the form of a sheet. The base film may consist of a thermoplastic resin which has good and balanced properties in terms of light transmittance, mechanical property (especially crashworthiness), thermal resistance and electrical property, for example without limitation polymethyl methacrylate, polyethylene terephthalate, polycarbonate or a combination thereof. And, it is more preferable that the base film 132 and the base material 131b of the protective layer 131 are different in refractivity to increase the haze effect.

The prism base 133 is disposed between the plurality of prisms 134 and the base film 132. The prism base 133 is provided for the easiness in forming the shape of the prisms 134 and the structural stability of the prisms 134. However, selectively, the prism base 133 may not be provided in the prism sheet 130b as shown in FIG. 5c.

The prisms 134 are disposed in parallel in a certain direction over the base film 132. The cross section of each prism 134 taken along the direction x normal to the axial direction of the prisms 134, i.e. the direction y is a triangle as shown in FIG. 5b. Preferably, the cross-section of each prism 134 is an isosceles triangle or a scalene triangle.

From a point of view of the brightness, it is preferred that the prism 134 has a structure of an isosceles triangle where the angle a is 90°, and the angle b and the angle c are equal to each other. But from another point of view of the viewing angle, it is preferred that the prism 134 has a structure of a scalene triangle where the angle a is larger than 90°, and the angel b and the angle c are not equal to each other. Namely, the isosceles triangle where the angle a is 90° is preferred for the higher brightness whereas the scalene triangle where the angle a is lager than 90° is preferred for the wider viewing angle.

The brightness depends on the pitch t of the prism 134 as well as the shape of the prism 134. Generally, the brightness increases as the pitch of the prism 134 gets larger, but the moiré patterns also get more conspicuous. Therefore, for the display quality, it is important to the pitch t of the prism 134 is selected within the range where the moiré patterns do not develop while the high brightness is maintained.

The range of the pitch t of the prism 134 where the moiré patterns do not develop while the high brightness is maintained was found to be about 32 µm to 38 µm by the inventors of the present invention. Preferably, the pitch t of the prism 134 is selected from the range of about 32 µm to 36 µm. Most preferably, the pitch t of the prism 134 is 35 µm.

The prism 134 may consist of a thermoplastic resin selected from the group of polymethyl methacrylate, polyethylene terephthalate, polycarbonate or a combination thereof.

Referring back to FIG. 3, the protector sheet 130c may be disposed over the prism sheet 130b to prevent the surface of the prism sheet 130b from being damaged and re-widen the viewing angle narrowed by the prism sheet 130b within a certain range.

The specified structure and materialistic property of the protector sheet 130c are not important to understand and work the present invention, and conventional structure and material normally used in the art are widely applicable to the protector sheet 130c of the present invention.

The idea of the present invention is not limited to the structure of the backlight unit 120 shown in the previous embodiment with reference to FIG. 3. In the foregoing embodiment, the backlight unit 120 is of the edge-light type where the light from the light source 150 is input into the light guide plate 170 through its side surfaces, the idea of the present invention may, however, be applicable to the backlight unit described hereinafter.

Hereinafter, other embodiments of the present invention will be described in detail with reference to the drawings. In the following embodiments, the same reference numbers will be used to refer to the same or like parts as those in the aforementioned embodiment. In addition, detailed descriptions of the identical elements are omitted.

Figure 6A:
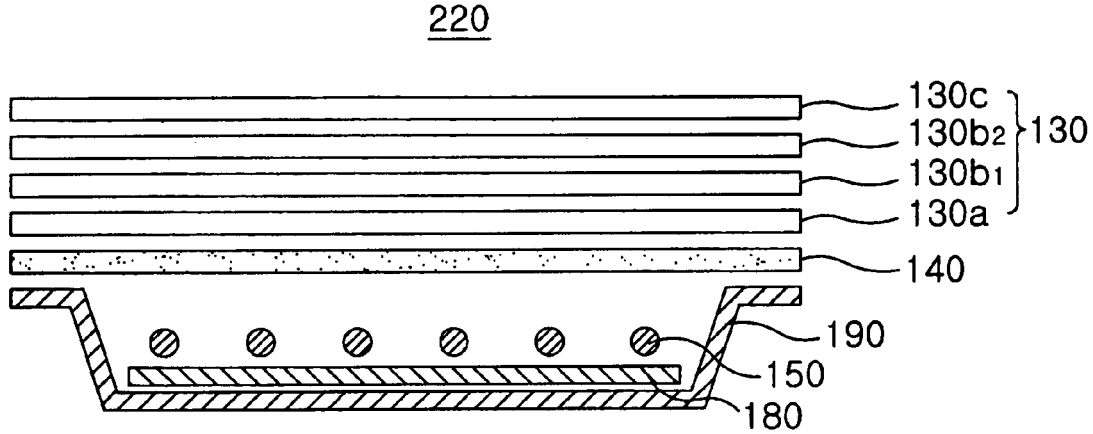
Figure 6B:
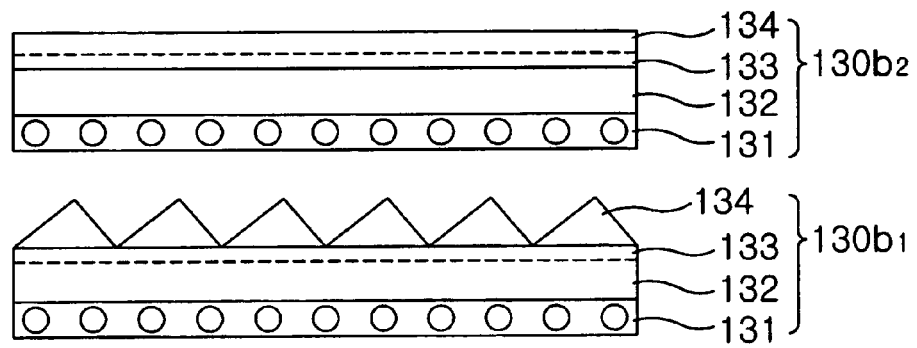

FIG. 6a is a cross-sectional view of another embodiment of the backlight unit of FIG. 6a, and FIG. 6b is an enlarged view of the prism sheets of FIG. 6a.

Referring to FIG. 6a, the backlight unit 220 comprises a plurality of light sources 150, a reflector sheet 180, a bottom chassis 190 receiving the light sources 150 and the reflector sheet 180, a diffuser plate 140 and a set of optical sheets 130.

The linear light source such as CCFL or EEFL as described regarding the backlight unit 120 of FIG. 3 may also be used for the light sources 150. The surface light source comprising the point light sources such as the LEDs mounted on a surface of a printed circuit board (PCB) may also be used.

The reflector sheet 180 is disposed under the light sources 150 and reflects the light toward the position where the liquid crystal panel is disposed, thereby the light efficiency is improved.

The light sources 150 and the reflector sheet 180 are received inside the bottom chassis 190.

The light generated at the light sources 150 is input into the diffuser plate 140 disposed over the light sources 150. The diffuser plate 140 may consists of for example a transparent acrylic resin such as polymethyl methacrylate and include diffusers such as beads to scatter the light and widen the viewing angle.

A set of optical sheets 130 are disposed over the diffuser plate 140. The set of optical sheets 130 may be comprised of a diffuser sheet 130a, a pair of prism sheets 130b1 and 130b2 and a protector sheet 130c.

The light passing through the diffuser plate 140 is input into the diffuser sheet 130a which scatters the light to make the light uniform across the viewing plane of the liquid crystal panel and widen the viewing angle.

A pair of prism sheets 130b1 and 130b2 is disposed over the diffuser sheet 130a to improve the light efficiency and the brightness. The pair of prism sheets 130b1 and 130b2 compensates the declined brightness due to the diffuser sheet 130a. The prism sheets 130b1 and 130b2 refract the light passing in low angles through the diffuser sheet 130a and collimate the light toward the front direction to improve the brightness within the effective viewing angle.

According to one embodiment of the present invention, the prism sheets 130b1 and 130b2 are provided in the backlight unit 220 in such a manner that the axes of the linear prisms of the prism sheets 130b1 and 130b2 are disposed to cross each other. Such structure has an advantage that the brightness is improved. Preferably, the prism sheets 130b1 and 130b2 are disposed such that the axes of their linear prisms cross at right angles.

The protector sheet 130c is disposed over the prism sheet 130b2 to protect the surface of the prism sheet 130b2 and widen the viewing angle narrowed by the prism sheets 130b1 and 130b2.

Figure 7:
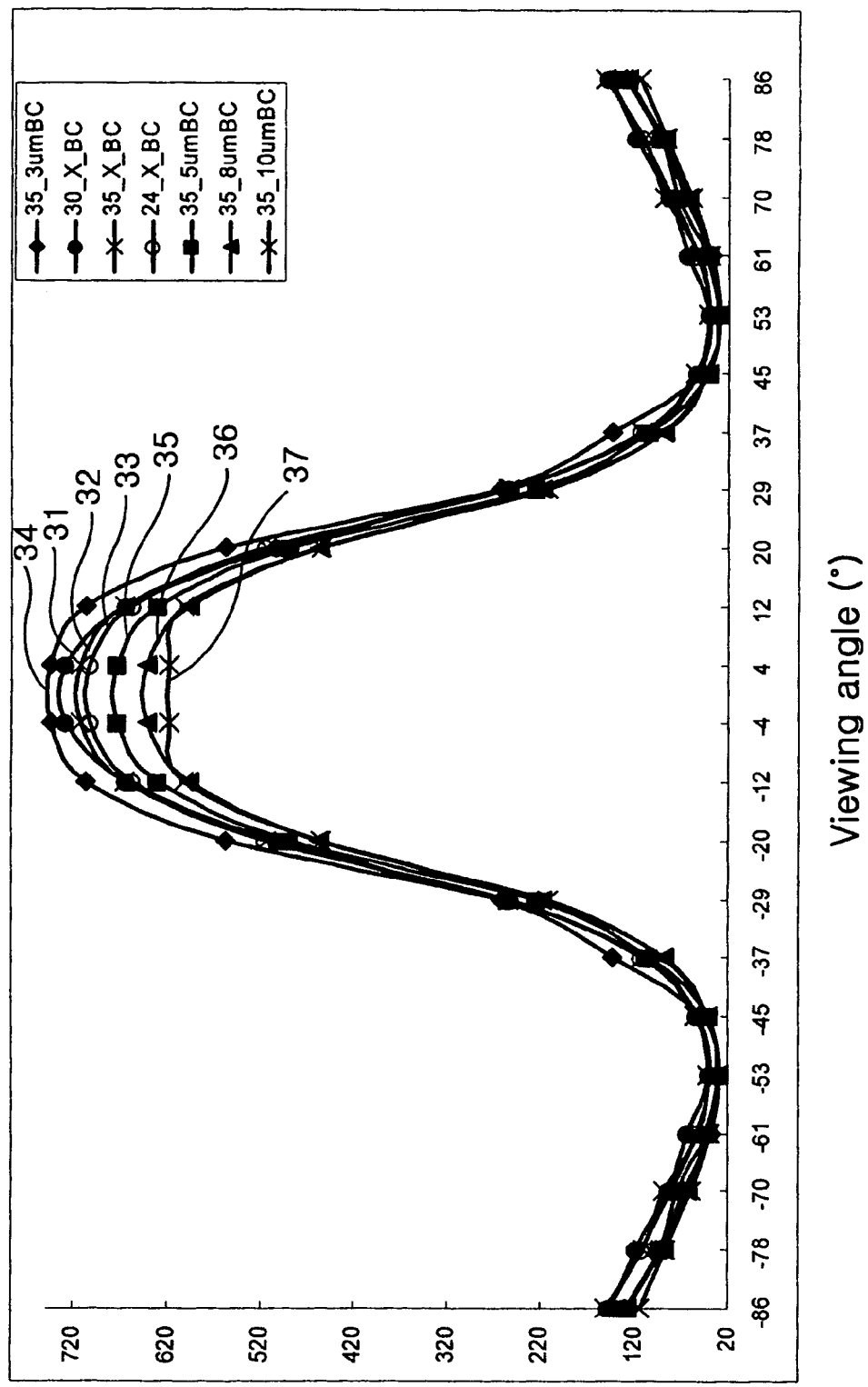
FIG. 7 is a diagram showing the relation of the variation of the brightness against the viewing angle in several samples for the backlight unit.

FIG. 7 is a diagram showing the relation of the variation of the brightness against the viewing angle in several samples for the backlight unit.

The samples used in the simulation test were the backlight units employed in a normal mobile handset display.

Each sample had a prism sheet having a different structure each other. And all samples had a diffuser sheet Ets-D7 (haze 65.82%, transmittance 89.61%) in common commercially obtainable from LG Electronics Co. Ltd. The prism sheets were classified according to whether to have the protective layer, the pitch of the prism and the size of the diffusion particles in the protective layer.

In the simulation test, the relation between the brightness and the viewing angle was measured under the condition where two prism sheets are disposed in such a manner that the axes of the prism sheets cross each other. The results of the samples where the moiré patterns did not develop are shown in the FIG. 7.

The curves 31, 32 and 33 represent the results of the samples which have the prism pitches of 30 μm, 24 μm and 35 μm respectively, and have no protective layer like conventional prism sheets. On the other hand, the curve 34 represents the prism sheet where the prism pitch is 35 μm and the size of the diffusion particles in the protective layer is 3 μm; the curve 35 represents the prism sheet where the prism pitch is 35 μm and the size of the diffusion particles in the protective layer is 5 μm; the curve 36 represents the prism sheet where the prism pitch is 35 μm and the size of the diffusion particles in the protective layer is 8 μm; and the curve 37 represents the prism sheet where the prism pitch is 35 μm and the size of the diffusion particles in the protective layer is 10 μm.

As shown in the curve 34, where the prism pitch is 35 μm and the size of the diffusion particles in the protective layer is 3 μm, the brightness as well as the viewing angle are more desirable compared to the conventional prism sheets represented by the curves 31, 32 and 33. Namely, it can be noted that according to the present invention, the problem of the moiré patterns can be solved without sacrificing the brightness.

Comparing the remaining curves 35-37 with the curves 31-33, it can be noted that the brightness is slightly higher at the center portion of the viewing plane in the conventional prism sheets than in the prism sheet of the present invention, but the viewing angles are at almost equal levels.

What is claimed is:

1. A backlight unit configured to illuminate a liquid crystal panel, comprising:
    at least one light source;
    at least one prism sheet disposed at the back of the liquid crystal panel; and
    a light guide plate including a light incidence surface disposed adjacent to the light source and a light emitting surface disposed substantially in parallel with the prism sheet,
    wherein the prism sheet including:
    a protective layer including a base material and a plurality of diffusion particles distributed in the base material, wherein the base material includes a light-transmissive resin;
    a base film disposed on a surface of the protective layer, wherein the light emitted from the protective layer is input into the base film; and
    a plurality of linear prisms disposed in parallel on a surface of the base film,
    wherein the diffusion particles comprise a plurality of beads having a size of between about 2 μm and about 10 μm, and the plurality of linear prisms have a pitch of between about 32 μm and about 36 μm, and
    wherein the at least one prism sheet includes at least two prism sheets disposed in such a manner that the axes of the linear prisms of the two prism sheets are disposed to cross each other.

2. The backlight unit of claim 1, wherein the prism sheet further comprises a prism base disposed between the base film and the plurality of linear prisms.

3. The backlight unit of claim 1, wherein the plurality of beads are substantially of the same size.

4. The backlight unit of claim 1, wherein the cross-section of the linear prism includes an isosceles triangle or a scalene triangle.

5. A liquid crystal display comprising:
    a liquid crystal panel displaying images according to electrical signals provided from the outside device; and
    a backlight unit configured to illuminate a liquid crystal panel, comprising:
    at least one light source;
    at least one prism sheet disposed at the back of the liquid crystal panel; and
    a light guide plate including a light incidence surface disposed adjacent to the light source and a light emitting surface disposed substantially in parallel with the prism sheet,
    wherein the prism sheet including:
    a protective layer including a base material and a plurality of diffusion particles distributed in the base material, wherein the base material includes a light transmissive resin;
    a base film disposed on a surface of the protective layer, wherein the light emitted from the protective layer is input into the base film; and
    a plurality of linear prisms disposed in parallel on a surface of the base film,
    wherein the diffusion particles comprise a plurality of beads having a size of between about 2 μm and about 10 μm, and the plurality of linear prisms have a pitch of between about 32 μm and about 36 μm, and
    wherein the at least one prism sheet includes at least two prism sheets disposed in such a manner that the axes of the linear prisms of the two prism sheets are disposed to cross each other.

6. The liquid crystal display of claim 5, wherein the plurality of beads are substantially of the same size.

7. The liquid crystal display of claim 5, wherein the cross-section of the linear prism taken normal to an axis of the linear prism includes an isosceles triangle or a scalene triangle.

* * * * *